US011320528B1

(12) United States Patent
Messina et al.

(10) Patent No.: US 11,320,528 B1
(45) Date of Patent: May 3, 2022

(54) MONOPULSE SECONDARY SURVEILLANCE RADAR SYSTEM

(71) Applicant: Telephonies Corporation, Farmingdale, NY (US)

(72) Inventors: Frank D. Messina, Huntington, NY (US); Bhavesh M. Patel, Forest Hills, NY (US)

(73) Assignee: Telephonics Corporation, Farmingdale, NY (US)

( * ) Notice: Subject to any disclaimer, the term of this patent is extended or adjusted under 35 U.S.C. 154(b) by 0 days.

(21) Appl. No.: 17/088,768

(22) Filed: Nov. 4, 2020

Related U.S. Application Data (60) Provisional application No. 62/937,815, filed on Nov. 20, 2019.

(51) Int. Cl.
*G01S 13/44* (2006.01)
*G01S 13/78* (2006.01)
(Continued)

(52) U.S. Cl.
CPC ........ *G01S 13/4463* (2013.01); *G01S 7/4026* (2013.01); *G01S 13/4454* (2013.01);
(Continued)

(58) Field of Classification Search
CPC ............. G01S 13/4454; G01S 13/4463; G01S 13/4472; G01S 13/762; G01S 13/782; G01S 7/4026
See application file for complete search history.

(56) References Cited

U.S. PATENT DOCUMENTS 4,689,623 A   8/1987   Schwab
4,926,184 A   5/1990   Galati
(Continued)

FOREIGN PATENT DOCUMENTS

CN   102520398         6/2012
CN   103701488 A  *  4/2014
(Continued)

*Primary Examiner* — Vladimir Magloire
*Assistant Examiner* — Oladimeji Oyegunle
(74) *Attorney, Agent, or Firm* — Thomas A. O'Rourke; Bodner & O'Rourke, LLP (57) ABSTRACT

A monopulse secondary surveillance radar is configured to integrate replies to active interrogations and passive squitter reception into a single surveillance system, and includes: a three-channel antenna arrangement; a redundant ADS-B antenna arrangement including a first and second omnidirectional ADS-B antenna, each having a low noise amplifier, and each being integrated with a GPS antenna; and a pair of redundant four-channel interrogators. The three-channel antenna arrangement is configured to transmit interrogations, and to receive corresponding replies from an aircraft transponder. The first ADS-B antenna is coupled to a first of the pair of redundant four-channel interrogators, and the second ADS-B antenna is coupled to a second of said pair of redundant four-channel interrogators, for the monopulse secondary surveillance radar to provide real-time passive detection of ADS-B-equipped aircraft and active radar detection of aircraft to each of the pair of redundant four-channel interrogators.

5 Claims, 5 Drawing Sheets

(51) Int. Cl.
　　　*G01S 13/76*　　　(2006.01)
　　　*G01S 7/40*　　　(2006.01)
(52) U.S. Cl.
　　　CPC .......... *G01S 13/762* (2013.01); *G01S 13/782* (2013.01); *G01S 13/4472* (2013.01)

(56) References Cited

U.S. PATENT DOCUMENTS

| | | | |
|---|---|---|---|
| 5,063,386 | A | 11/1991 | Bourdeau |
| 5,196,855 | A | 3/1993 | Kuroda |
| 5,341,139 | A | 8/1994 | Billaud |
| 5,570,095 | A | 10/1996 | Drouilhet |
| 5,619,206 | A | 4/1997 | Cole |
| 5,629,705 | A | 5/1997 | Spettel |
| 5,835,059 | A | 11/1998 | Nadel |
| 6,710,739 | B1 | 3/2004 | Loegering |
| 6,819,282 | B1 | 11/2004 | Galati |
| 7,095,360 | B2 | 8/2006 | Kuji |
| 7,495,612 | B2 | 2/2009 | Smith |
| 7,889,115 | B2 | 2/2011 | Klingman |
| 8,004,452 | B2 | 8/2011 | Rolfe |
| 8,362,943 | B2 | 1/2013 | Jacobs |
| 8,674,872 | B2 * | 3/2014 | Billaud .................. G01S 7/034 342/39 |
| 9,193,458 | B2 | 11/2015 | Pongratz |

FOREIGN PATENT DOCUMENTS

| | | | |
|---|---|---|---|
| CN | 205620548 | | 10/2016 |
| CN | 106371091 | | 2/2017 |
| CN | 108152807 | | 6/2018 |
| DE | 19637843 | | 3/1998 |
| DE | 69227316 | | 6/1999 |
| EP | 0016417 | | 10/1980 |
| EP | 1704549 | | 3/2009 |
| EP | 2256574 | A1 | 1/2010 |
| EP | 2930531 | | 10/2015 |
| EP | 3273262 | | 1/2018 |
| EP | 3273262 | A1 * | 1/2018 ............. G01S 13/44 |
| FR | 2939904 | | 6/2010 |
| GB | 2057808 | A | 4/1981 |
| JP | S6288979 | | 4/1987 |
| JP | 2778326 | | 7/1998 |
| JP | 2830610 | | 12/1998 |
| JP | 2988396 | | 12/1999 |
| JP | 3015502 | | 3/2000 |
| JP | 2009014508 | | 1/2009 |
| JP | 2010066069 | | 3/2010 |
| JP | 4551827 | | 9/2010 |
| JP | 4746438 | | 8/2011 |
| JP | 5135291 | | 2/2013 |
| JP | 2013083542 | | 5/2013 |
| JP | 5380153 | | 1/2014 |
| KR | 0166954 | | 3/1999 |
| KR | 101461131 | | 11/2014 |
| RU | 147511 | | 11/2014 |
| RU | 2606386 | | 1/2017 |
| RU | 2630278 | | 9/2017 |

* cited by examiner

FIG. 1
(Prior Art)
Conventional 3-Channel Monopulse Secondary Surveillance Radar (SSR)

FIG. 1A

(Prior Art)

Schematic of Conventional 3-Channel Monopulse SSR

MONOPULSE SECONDARY SURVEILLANCE RADAR SYSTEM

CROSS REFERENCE TO RELATED APPLICATIONS

This application claims priority on U.S. Provisional Application Ser. No. 62/937,815 filed on Nov. 19, 2020, the disclosures of which are incorporated herein by reference.

FIELD OF THE INVENTION

The subject technology relates generally to radar systems, and more particularly to improvements to Monopulse Secondary Surveillance Radar Systems.

BACKGROUND OF THE INVENTION

A Radio Detecting and Ranging (RADAR) system generally consists of a transmitter used to produce an electromagnetic signal, an antenna configured to radiate that signal in a particular direction or directions, a receiver designed to receive and analyze the signal reflected back to the system, and a duplexer that alternately switches the antenna between the transmitter and receiver, which permits only one antenna to be used, and forms a monostatic system. The switching is required in a monostatic system because the high-power pulses of the transmitter could damage the receiver if its energy were allowed to enter the receiver.

A radar may be classified as either primary or secondary. A monostatic primary surveillance radar (PSR) operates using the transmitter, the receiver, the duplexer, and narrow beam antenna that repetitively transmits and rotates through 360 degrees each antenna scan. The antenna radiates a high-powered narrow wave front that propagates at the speed of light. The wave may be continuous or pulsed. The primary radar receives reflected signals from an aircraft (an echo) to determine the following:

the distance D of the aircraft from the radar based on the roundtrip wave transit time (i.e., the wave time along the path to the aircraft and back to the receiver);
an azimuth angle θ (i.e., bearing of the aircraft) based on the position of the directional antenna; and
radial velocity of the aircraft using the Doppler Effect.

Primary radar does not associate a radar return with a specific aircraft, which had been confusing when multiple aircraft were in close proximity, such as at or near a busy airport.

A monostatic secondary surveillance radar (SSR) system, which is utilized for Air Traffic Control in civil aviation, similarly uses the transmitter, the receiver, the duplexer, and a ground-based rotating antenna, but also utilizes other equipment to furthermore function as a cooperative two-way communication system.

In a SSR system, the ground-based antenna emits a narrow beam uplink interrogation signal in the form of an unaddressed information request. An omnidirectional transponder antenna on a receiving aircraft is illuminated by the emitted interrogation beam and the aircraft transponder detects the interrogation, and if decoded and validated, the transponder transmits a reply back to the SSR. The transponder therefore encodes and emits a response as a downlink signal—a "reply"—that is transmitted by the transponder omnidirectional antenna, and which may include certain information. The Mode A type of transponder is capable of transmitting a reply that only includes the aircraft's four digit identification or "squawk" code (e.g., "1200" for a VFR flight). The Mode C type of transponder is coupled to the aircraft's altimeter, and can transmit a reply that includes the aircraft's pressure altitude. Many general aviation aircraft have a dual mode transponder that listens for and replies to interrogations in both mode A and Mode C (i.e., is Mode A/C).

Secondary surveillance radar systems using mode A and mode C experience a problem known as "garble." Garble occurs where two or more aircraft are in close proximity (e.g., less than two miles apart in slant range) and the transmitted replies from those two aircraft overlap because of the limited size of the antenna beam width (typically 3 degrees), which confuses the ground decoder, and the information is essentially lost. The problem is compounded where there may be over-interrogation of transponders which occurs in busy metropolitan areas with multiples airports/radars, such as with New York's Kennedy and LaGuardia airports, or where military bases are in proximity to civil airports (e.g., Hunter Army Airfield in Savannah is only 14 miles away from the Savannah/Hilton Head International Airport).

Under typical SSR systems, the aircraft's position is refreshed as the antenna illuminates and interrogates the aircraft and its transponder replies, which illumination occurs once per each revolution of the antenna. Therefore, a solution for synchronous garble was devised whereby the interrogation rate was increased (i.e., about 12 times per antenna scan) in order to receive more replies, so that some replies would be clear of interference. But, the process is largely self-defeating because increasing the rate of interrogation and replies only serves to increase the self-interference due to overlapping replies because of the greater density of replies.

To reduce the reply density, and the corresponding quantity of lost replies, the Mode S radar and transponder was developed. Mode S may be considered to be analogous to an airborne communication modem. The mode S system uses two types of RF interrogations—Mode S All-Calls, and Mode S Roll-Calls. The Mode S radar interrogator system must start the aircraft communication exchange by emitting the "all-call" interrogations over a wide surveillance volume, which are addressed to all properly equipped aircraft to solicit a responses from and to initially acquire all Mode S aircraft positions and identifications. Once the mode S aircraft in the volume are acquired by the active All-Call interrogations and each position and track is acquired, the active interrogator on subsequent antenna scans can then proceed to discretely address (i.e., "communicate with") each individual aircraft in the surveillance volume with unique Mode S interrogations—the Mode S Roll-Call, using the aircraft's globally unique 24-bit address, and which utilizes a much lower interrogation rate than is used for the All-Call interrogations. Since the discretely addressed, Mode S Roll-Call interrogations are only directed at one aircraft, only that one aircraft will reply. The Mode S radar therefore permits air traffic control to track closely spaced aircraft, even one flying directly above the other. Once a particular aircraft is acquired, the Mode S radar may also send a Roll-Call lockout request to the aircraft to prevent it from responding to an all-call interrogation for a period of 18 seconds. If the Mode S Transponder does not decode another lockout request within the 18 second period it will respond to All-Call interrogations again.

The Mode S transponder will transmit (i.e., "squitter response") about two times per second, under the Mode S Elementary Surveillance System (ELS) format, the aircraft's ID and altitude, without being interrogated, and utilizes the same 1090 MHz frequency as Mode A/C, making it backward compatible. The short squitter response Mode S format is 56 bits long, having an 8 bit control or preamble for synchronization, the 24 bit aircraft ID/address, and a 24 bit parity check.

Under the Mode S Enhanced Surveillance System (EHS), an "extended squitter" format is 112 bits long, having an 8 bit control or preamble, the 24 bit aircraft ID/address, a 56 bit message, and a 24 bit parity check. The 56 bit message is an unsolicited downlink transmission that may provide further information about the aircraft's state and intent, which are referred to as Downlink Aircraft Parameters (DAPs). The DAPs are intended to provide improved situational awareness for air traffic controllers, and permit cross-checking of navigation instructions provided to pilots and help provide early identification of a loss of separation between aircraft. The DAPs may include: magnetic heading; indicated Airspeed or Mach number; vertical rate; roll angle; track angle rate; true track angle; ground speed; and selected altitude.

A Mode S transponder that is compatible with the ADS-B (Automatic Dependent Surveillance-Broadcast) system will be required by the FAA on all aircraft (typically commercial aircraft) flying in Class A airspace (i.e., above 18,000 feet MSL) as of Jan. 1, 2020. ADS-B will provide the next generation of air traffic control, being based on satellite-derived aircraft positions instead of ground-based radar. The Mode S transponder that is compatible with the ADS-B will obtain position information via GPS, and will also transmit the aircraft's position in addition to the DAPs to the air traffic controller, and to other aircraft that are similarly equipped.

The mode S All-Call interrogation is the most destructive to the radar environment spectrum because it is a wide area broadcast that asks many Mode S aircraft to respond in order for them to be acquired.

The apparatus disclosed herein improves upon the limited squitter range and surveillance coverage of the traditional three-channel monopulse secondary surveillance radar (MSSR) antenna system, due to the inherent lower coverage of the MSSR antenna and active-transmit channels. In addition, the herein disclosed system uses the Mode S Squitter responses to provide the active interrogator with Mode S addresses for aircraft within the surveillance volume supporting mode S acquisition without the need to actively interrogate as many Mode S All-Call interrogations and elicit additional Mode S responses from aircraft within the surveillance volume. By using a passive ADS-B reception capability within the active Mode S interrogator, the herein disclosed system can initially acquire (i.e., "seed") the MSSR interrogator with the mode S aircraft received by the ADS-B system without the need for a large number of Mode S All-Call interrogations (see FIG. 3A, in which two additional aircraft are acquired by the ADB-B antenna that are at a greater range than the one aircraft acquired by the all-call interrogations, and are used to "seed" the MSSR interrogator). In effect the passive ADS-B reception and aircraft information would be used in lieu of the Mode S active interrogation and reply interchange. This merged capability—passive ADS-B and active Mode S MSSR—is used to lower the active Mode S All-Call interrogations by using passive ADS-B for the Mode S aircraft acquisition.

Devices/methods that may be related, and which are not admitted herein to be prior art to the disclosed apparatus, may be shown by the following: U.S. Pat. No. 8,004,452 to Rolfe; European Patent No. EP2930531 to Billaud; and EP 3273262 (Hensoldt Sensors).

It is furthermore noted that citing herein of any patents, published patent applications, and non-patent literature throughout the following portions of this disclosure is not an admission as to any of those documents constituting prior art with respect to the herein disclosed apparatus.

OBJECTS OF THE INVENTION

It is an object of the invention to integrate a dedicated auxiliary passive ADS-B squitter receive channel within the interrogators of an active Monopulse Secondary Surveillance Radar (MSSR) to provide live real-time passive acquisition of ADS-B and Mode 5 Level 2 equipped aircraft to the active interrogator to improve active target detection and reporting and overall 1030/1090 MHz Spectrum Efficiency.

It is an object of the invention to integrate a dedicated auxiliary passive squitter receive channel within the interrogators of an active Monopulse Secondary Surveillance Radar (MSSR) to provide improved probability of detection by integrating active and passive (Identification, Friend or Foe) IFF/ATC Sensor technology within a single IFF/ATC monopulse secondary surveillance system.

It is an object of the invention to provide an independent high-gain, full-range fourth squitter receiver channel to compliment the limited squitter range and surveillance coverage of the traditional three-channel monopulse secondary surveillance radar system. (Note that a traditional three-channel monopulse secondary surveillance radar will provide some performance capability detecting squitter responses but the three-channel MS SR antenna is not at all optimal for this capability and exhibits low surveillance range and lower probability of intercept as compared to the standalone ADS-B antenna and internal LNA).

It is another object of the invention to provide a significant coverage benefit over the traditional monopulse secondary surveillance radar (MSSR) system, which has limited squitter surveillance coverage due to the inherent lower coverage of the MSSR active/transmit channels.

It is a further object of the invention to provide radar target detection processing at the RF reply level providing real-time detection versus integrating the non-real-time interfaces across other sub-systems at the target report level.

It is another object of the invention to provide improved aircraft detection and radar performance by merging passive and active long range technologies within a single system, to improve 1030/1090 MHz spectrum efficiency.

It is also an object of the invention to provide improved high elevation aircraft detection within a monopulse secondary surveillance radar in the rotating antenna's cone of silence.

It is another object of the invention to provide an improved monopulse secondary surveillance radar that enhances the probability of intercept of passive ADS-B, and enhances passive acquisition techniques to support Mode S surveillance.

It is also an object of the invention to provide an improved monopulse secondary surveillance radar that enhances reflection/false target identification techniques, and enhances passive ADS-B squitter proof detection.

It is another object of the invention to integrate ADS-B antennas and an auxiliary fourth channel for receiving squitter into a monopulse secondary surveillance radar detection processing chain to lower the active RF L-band spectrum utilization and provide greater detection coverage (range and elevation) within the radar's surveillance volume, including the cone of silence.

It is also an object of the invention to provide an improved long range/high elevation detection capability that permits improvements in: reflection/false target identification; passive acquisition within the surveillance volume; and situational awareness.

It is another object of the invention to eliminate the need for a separate GPS antenna by integrating a GPS antennas and the ADS-B omnidirectional antenna into the same unit.

It is also an object of the invention to provide improved overall radar system reliability by using combined hardware for both active and passive detection.

Further objects and advantages of the invention will become apparent from the following description and claims, and from the accompanying drawings.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A conventional secondary surveillance radar system includes: a three-channel antenna having a sum channel, a difference channel, and an omega channel, to transmit interrogations and receive corresponding replies from aircraft transponders; and a pair of three channel interrogators coupled to the three-channel antenna, and including a transmitter and a receiver.

The apparatus disclosed herein provides an independent high-gain, full-range fourth receiver channel and two omnidirectional squitter antennas to compliment the limited squitter range and surveillance coverage of the traditional three-channel monopulse secondary surveillance radar (MSSR) antenna system. The additional squitter antenna may be an ADS-B antenna that may provide live real-time passive acquisition of ADS-B and Mode 5 Level 2 equipped aircraft to the active interrogator to improve active target detection and reporting and overall 1030/1090 MHz Spectrum Efficiency. The fourth channel added to the interrogators and the additional omnidirectional antennas provide improved probability of detection by integrating active and passive IFF/ATC Sensor technology within a single IFF/ATC monopulse secondary surveillance radar system, as it may extend the range of the target acquisition and provide for target acquisition within the cone of silence. This arrangement also provides for radar target detection processing at the RF reply level for real-time detection versus integrating non-real-time interfaces across other sub-systems at the target report level, and provides improved high elevation aircraft detection within a monopulse secondary surveillance radar in the rotating antenna's cone of silence.

BRIEF DESCRIPTION OF THE DRAWINGS

The description of the various example embodiments is explained in conjunction with appended drawings, in which.

DETAILED DESCRIPTION OF THE INVENTION

As used throughout this specification, the word "may" is used in a permissive sense (i.e., meaning having the potential to), rather than a mandatory sense (i.e., meaning must), as more than one embodiment of the invention may be disclosed herein. Similarly, the words "include", "including", and "includes" mean including but not limited to.

The phrases "at least one", "one or more", and "and/or" may be open-ended expressions that are both conjunctive and disjunctive in operation. For example, each of the expressions "at least one of A, B and C", "one or more of A, B, and C", and "A, B, and/or C" herein means all of the following possible combinations: A alone; or B alone; or C alone; or A and B together; or A and C together; or B and C together; or A, B and C together.

Also, the disclosures of all patents, published patent applications, and non-patent literature cited within this document are incorporated herein in their entirety by reference. However, it is noted that citing herein of any patents, published patent applications, and non-patent literature is not an admission as to any of those references constituting prior art with respect to the disclosed apparatus.

Furthermore, the described features, advantages, and characteristics of any particular embodiment disclosed herein, may be combined in any suitable manner with any of the other embodiments disclosed herein.

Additionally, any approximating language, as used herein throughout the specification and claims, may be applied to modify any quantitative or qualitative representation that could permissibly vary without resulting in a change in the basic function to which it is related. Accordingly, a value modified by a term such as "about" is not to be limited to the precise value specified, and may include values that differ from the specified value in accordance with applicable case law. Also, in at least some instances, a numerical difference provided by the approximating language may correspond to the precision of an instrument that may be used for measuring the value. A numerical difference provided by the approximating language may also correspond to a manufacturing tolerance associated with production of the aspect/feature being quantified. Furthermore, a numerical difference provided by the approximating language may also correspond to an overall tolerance for the aspect/feature that may be derived from variations resulting from a stack up (i.e., the sum) of a multiplicity of such individual tolerances.

Figure 1:
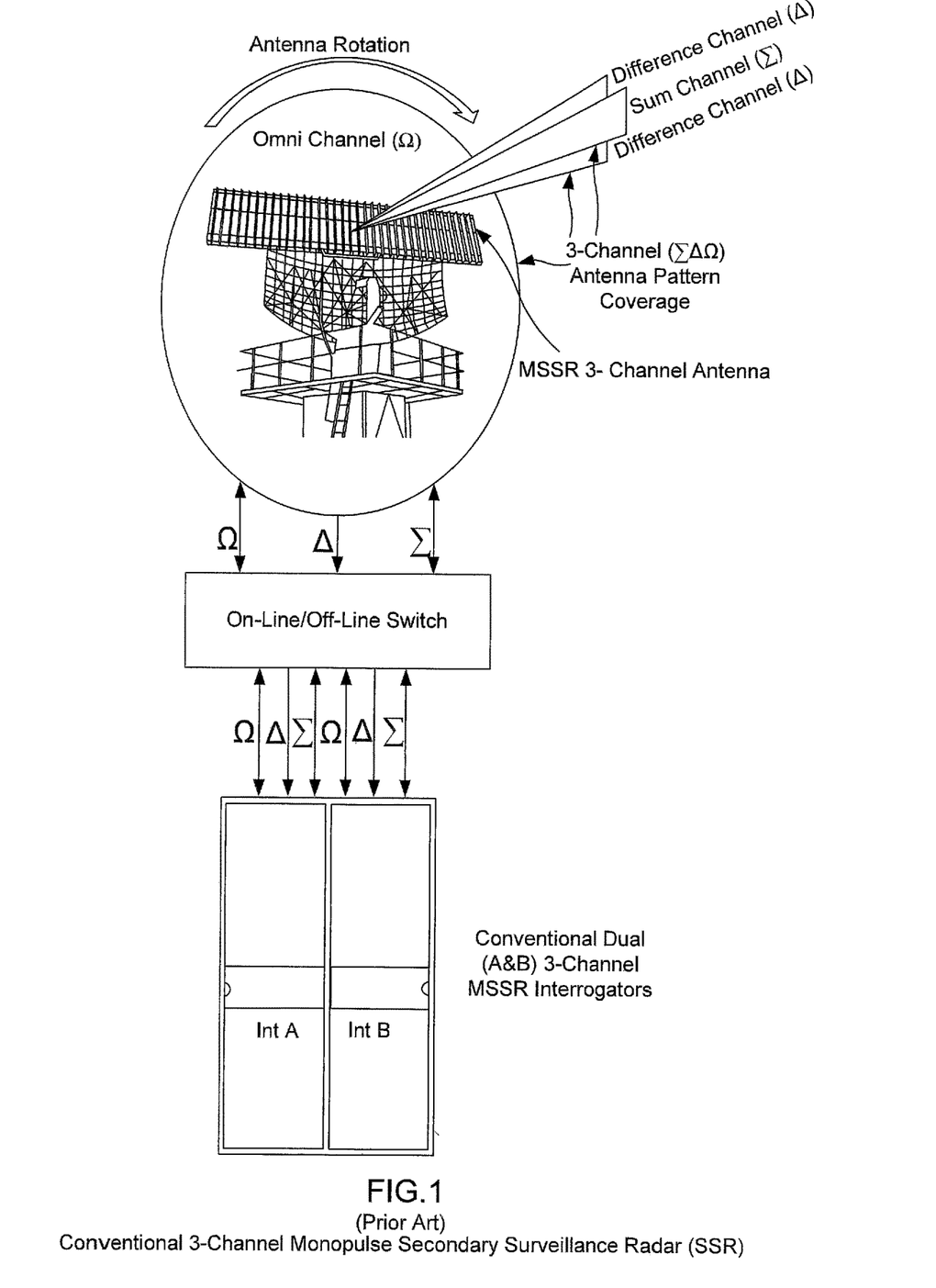
FIG. 1 illustrates a prior art conventional three-channel monopulse secondary surveillance radar system (MSSR) using dual (redundant) 3-channel interrogators.
Figure 1A:
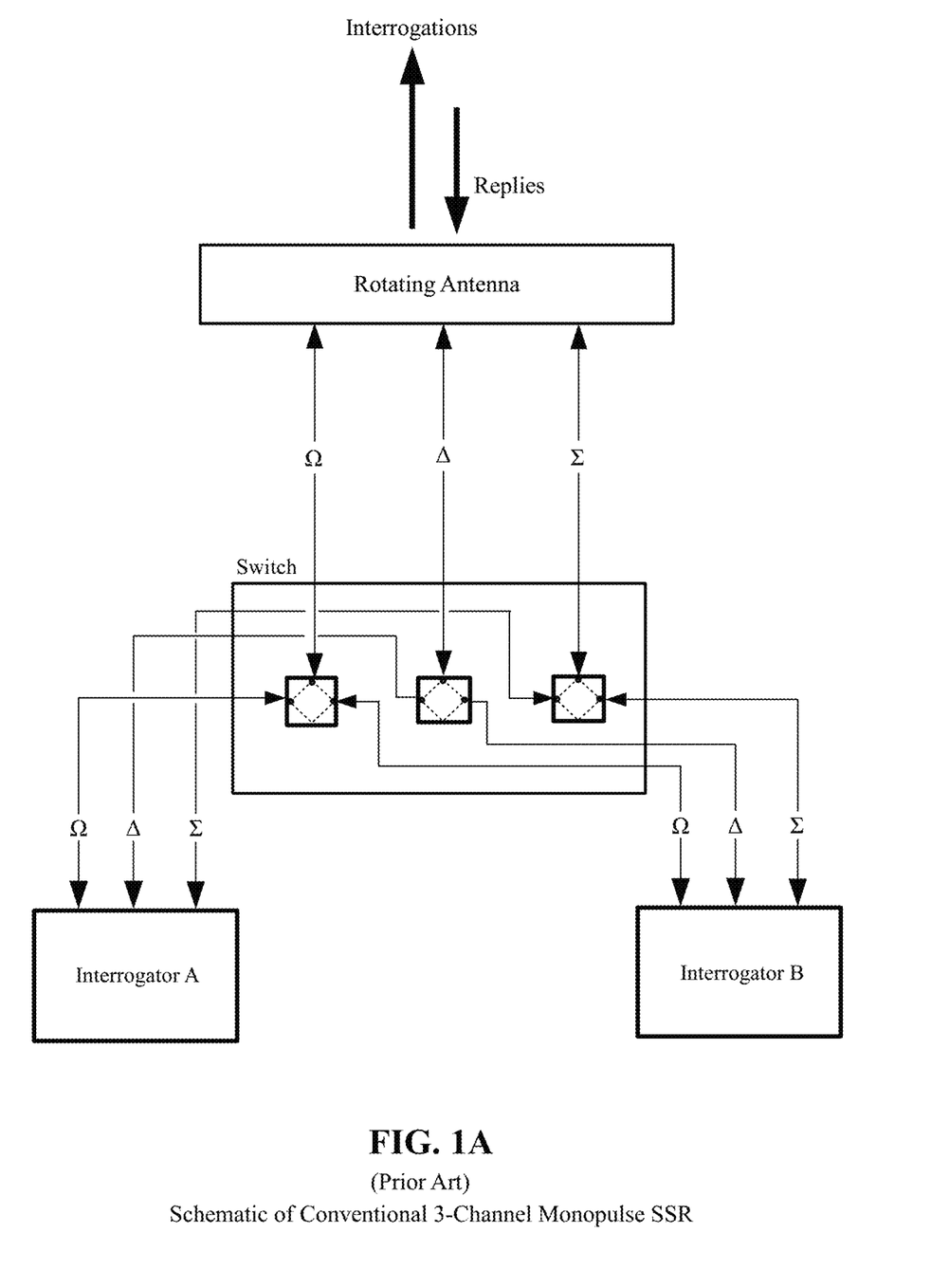
FIG. 1A is a schematic diagram of the prior art conventional three-channel monopulse secondary surveillance radar system of FIG. 1.

FIG. 1 illustrates a conventional monopulse secondary surveillance radar system (MSSR), which is shown schematically in FIG. 1A, and which includes an antenna configured for complete azimuth interrogation coverage through continuous 360 degree rotational movement of the antenna; and dual (redundant) 3-channel interrogators (interrogator A and interrogator B) each coupled to the antenna.

Figure 3:
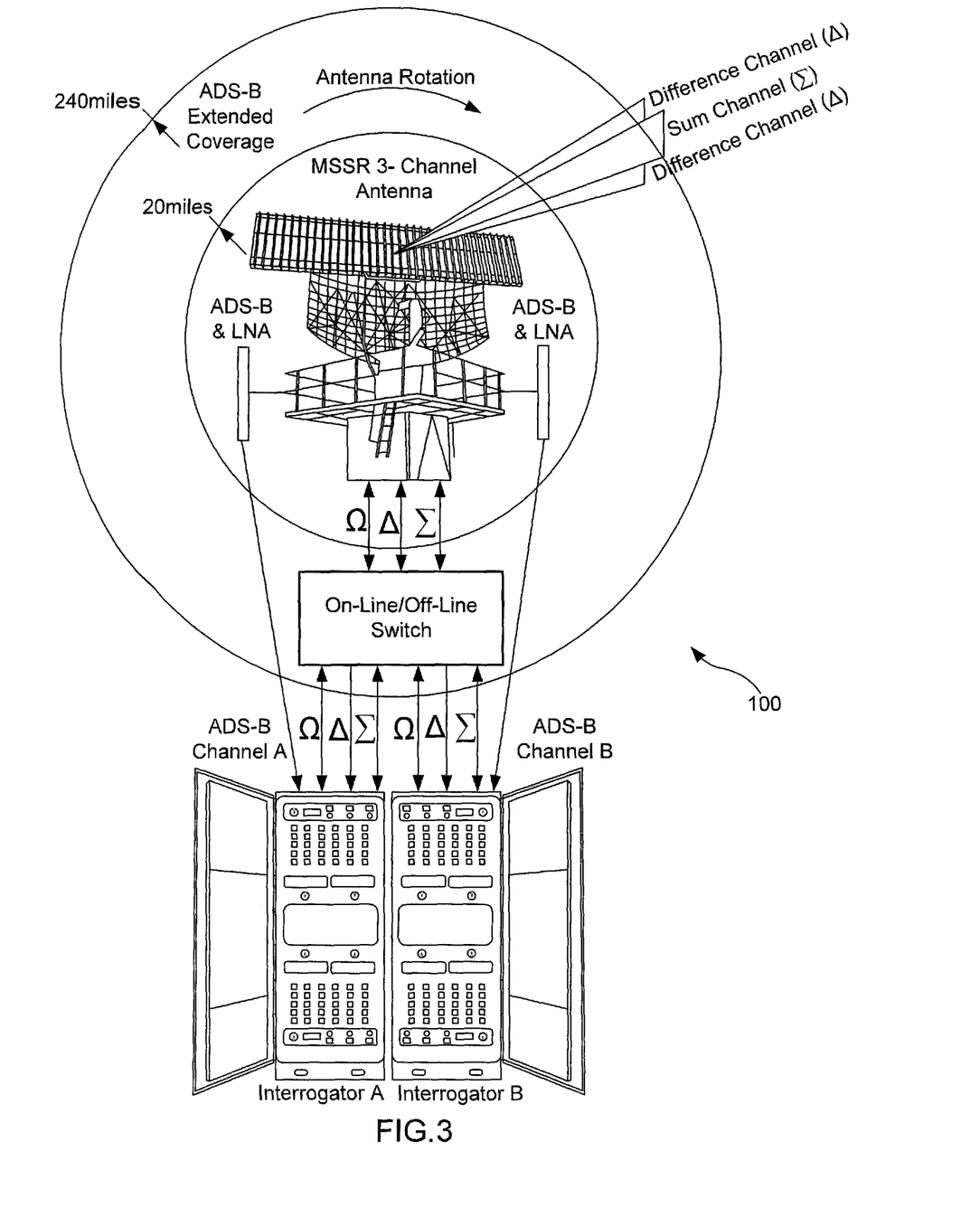
FIG. 3 illustrates a radar system as disclosed herein that includes a three-channel antenna arrangement; a pair of redundant four-channel interrogators, each coupled to the three-channel antenna arrangement; and a pair of omnidirectional ADS-B antennas coupled to the interrogators through an online/off-line switch.
Figure 3A:
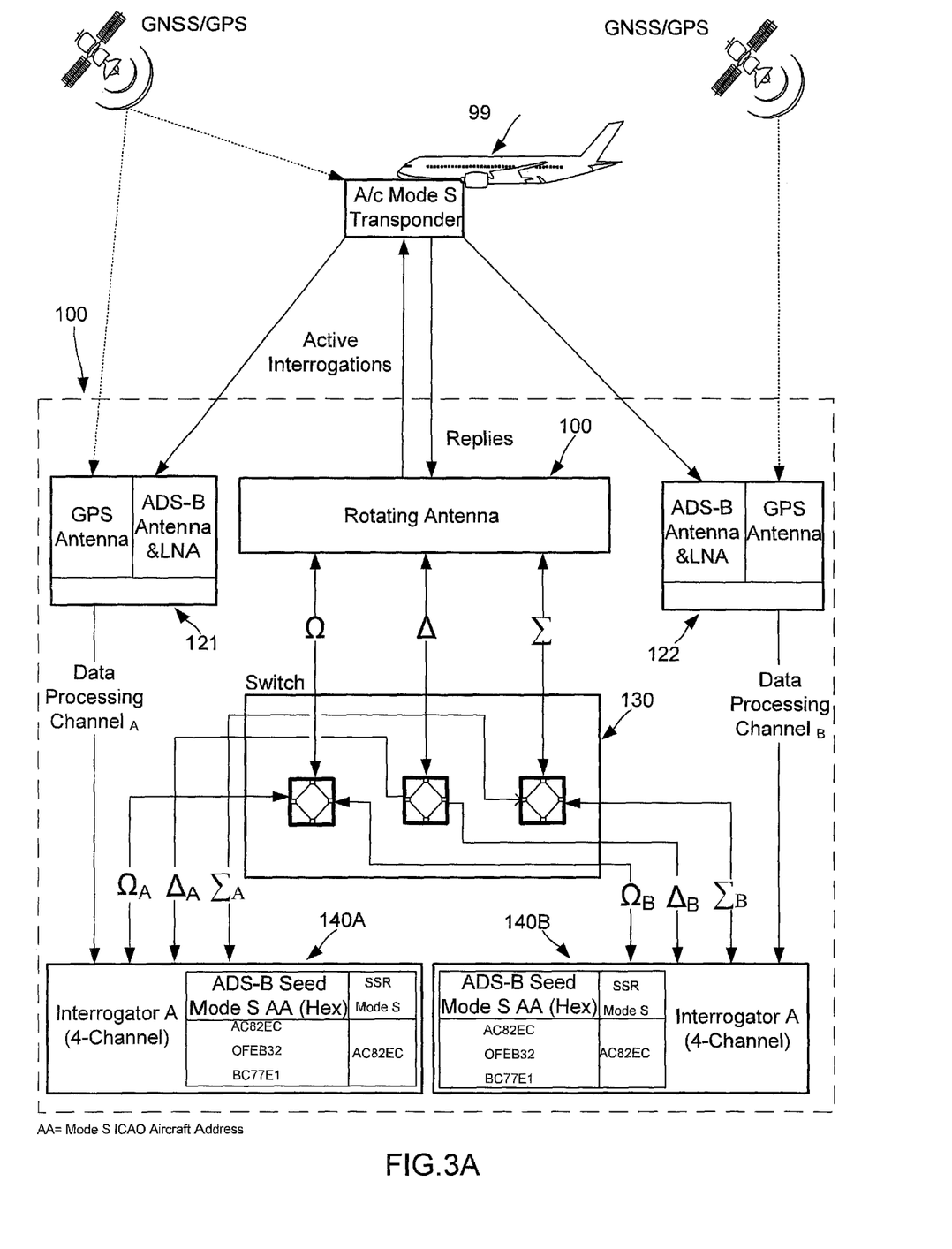
FIG. 3A is a schematic diagram of the monopulse secondary surveillance radar system of FIG. 3.

FIG. 3 illustrates an improved monopulse secondary surveillance radar system 100, which is shown schematically in FIG. 3A. The secondary surveillance radar system 100 includes a pair of four-channel interrogators (140A and 140B), each of which include a transmitter (TX) to transmit interrogations, and a receiver (RX) to receive replies, which active interrogations and radar reply signals are transmitted and received by the antenna 110. A fourth receiver and a data processing channel may be added to the three-channel interrogator along with additional software and firmware to create the four-channel interrogators (140A and 140B). The antenna 110 may also provide complete azimuth interrogation coverage through continuous 360 degree rotational movement. Each of the four-channel interrogators (140A/140B) may be coupled to the antenna 110 through a switch 130 and may be configured to transmit along three RF signal paths—a sum channel ($\Sigma$), a difference channel ($\Delta$), and an omni channel ($\Omega$). The switch 130 may couple the $\Sigma$, $\Delta$, and $\Omega$ channels from the antenna 110 to either the interrogator 140A using the $\Sigma_A$, $\Delta_A$, and $\Omega_A$ channels, or the interrogator 140B using the $\Sigma_B$, $\Delta_B$, and $\Omega_B$ channels, so that only one of the interrogators will be actively transmitting and receiving through the antenna. When switch 130 couples the $\Sigma$, $\Delta$, and $\Omega$ channels from the antenna 110 to interrogator 140A so that channels $\Sigma_A$, $\Delta_A$, and $\Omega_A$ are active, the transmitter/receiver and $\Sigma_B$, $\Delta_B$, and $\Omega_B$ channels of the interrogator 140B are the standby TX/RX channels.

The monopulse secondary surveillance radar system 100 also includes a first antenna arrangement 121, and a second antenna arrangement 122 that are co-located with the rotating antenna, and each of which include an omnidirectional ADS-B antenna. Each of the omnidirectional ADS-B antennas of the first antenna arrangement 121 and second antenna arrangement 122 are respective coupled to the interrogators through the Data Processing Channel A and the Data Processing Channel B. Each of the omnidirectional ADS-B antennas of the first and second antenna arrangements 121/122 are configured to receive unsolicited squittered transmissions spontaneously sent by an aircraft 99, in particular ADS-B Mode S 1030/1090 MHz extended squitters, IFF Mode 5 level 2 squittered reports, UAT (universal access transceiver) ADS-B messages, etc.

Each of the omnidirectional ADS-B antennas of the first and second antenna arrangements 121/122 are also particularly configured to integrate a low noise amplifier (LNA) within the base of the antenna, to realize an improvement in aircraft detection range. The LNA is used to amplify the ADS-B aircraft transponder data received by the antenna (e.g., the 1090 MHz RF received by the antenna elements). Each LNA has a noise figure of less than 1 dB and a RF signal gain of 21 dB to improve the RF signal level received by the antenna elements to extend the reception surveillance range, and improve the effective antenna gain, which in turn increases the reception range approximately four times higher than that of the antenna alone without the LNA, increasing the detection range of the system from 60 nm to 240 nm.

Each of the omnidirectional ADS-B antennas of the first and second antenna arrangements 121/122 may also have a GPS antenna integrated therein. The GPS location of the receiving antenna is required for several reasons. Although the GPS location of the responding aircraft is sent in the ADS-B message, the GPS location of the ground antenna is also required so that the range and azimuth position of the responding aircraft with respect to the receiving antenna can be determined. In addition, all ADS-B reports sent by the system require an accurate time-of-detection to be transferred with the aircraft report. Time tagging the reported ADS-B information is essential for the down-stream tracking equipment to correlate an aircraft position at an exact time, as the ADS-B information received from the aircraft does not include time. Thus, the integral GPS antenna and system provides not only the GPS location of the ground system, but also an accurate time-of-day that the ADS-B signal was received. As such, the monopulse secondary surveillance radar system 100 provides real-time passive detection of ADS-B-equipped aircraft.

Figure 2:
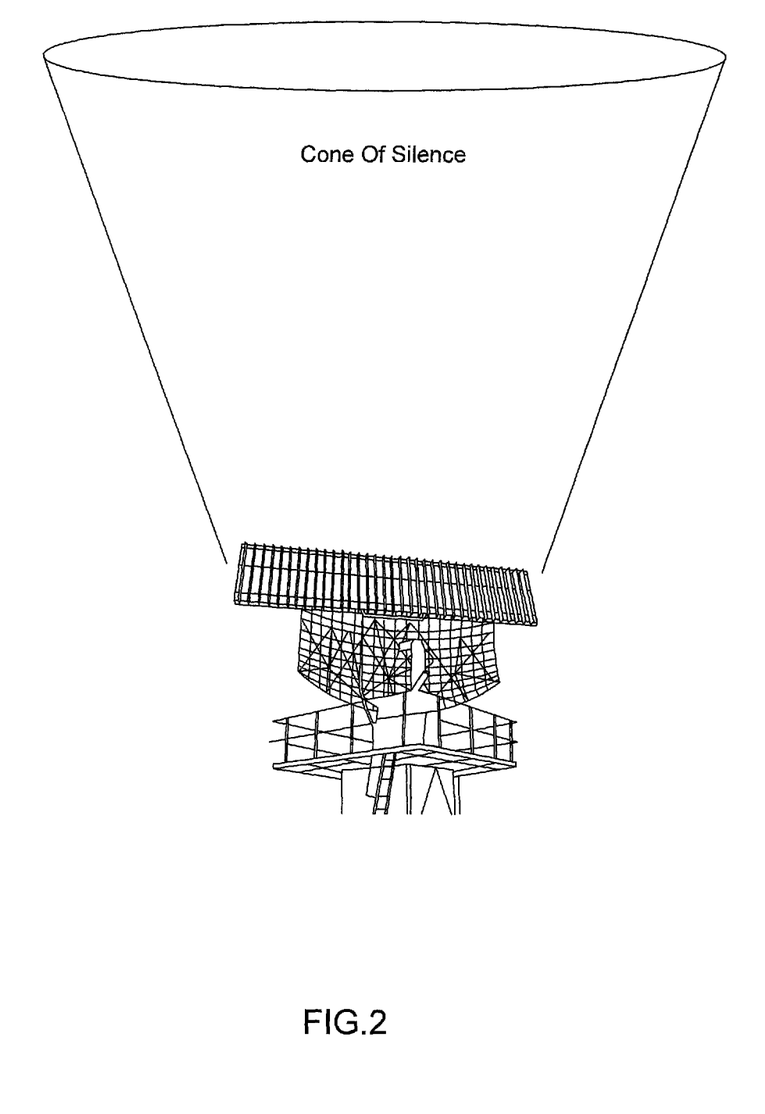
FIG. 2 illustrates the cone of silence above a conventional monopulse secondary surveillance radar.

The monopulse secondary surveillance radar system 100 being so configured,

Improves 1030/1090 MHz spectrum efficiency;

Provides improved aircraft detection and performance by merging passive and active long-range technologies within a single system;

Improves high elevation aircraft detection within the MSSR in the rotating antenna's cone of silence;

Enhances the probability of intercept of passive ADS-B;

Enhance passive acquisition techniques to support Mode S Surveillance;

Enhance reflection/false target identification techniques; and

Enhance passive ADS-B squitter spoof detection.

Since much of the Mode S RF spectrum is used by Mode S All-Call interrogations and responding aircraft reply's to initially acquire and "learn" the aircraft environment, passive ADS-B information received from Mode S aircraft may also be used by radar system 100 to acquire Mode S aircraft within the surveillance volume and can then be used by an active interrogator so that the reliance on active mode S all-call interrogations are minimized. Housing the active interrogation capability in the same unit as the passive ADS-B capability for radar system 100, while also sharing the information from the two sensors provides the capability to lower active mode S all-call interrogations and all-call responses from aircraft, thereby improving RF spectrum efficiency. In addition, the combined active and passive sensors that are located within the radar system 100 can share information providing a means to improve overall interrogator system performance. In this case the information received by the fourth ADS-B channel aids the information received by the three active interrogator channels and the two different sensor measurements are used to complement each other and to improve reporting performance. Lowering the spectrum emissions from an active interrogator also improves the performance of other active interrogator systems within the same surveillance volume (i.e., from other radar systems at neighboring airports) because there is less RF interference.

While illustrative implementations of one or more embodiments of the disclosed apparatus are provided hereinabove, those skilled in the art and having the benefit of the present disclosure will appreciate that further embodiments may be implemented with various changes within the scope of the disclosed apparatus. Other modifications, substitutions, omissions and changes may be made in the design, size, materials used or proportions, operating conditions, assembly sequence, or arrangement or positioning of elements and members of the exemplary embodiments without departing from the spirit of this invention.

Accordingly, the breadth and scope of the present disclosure should not be limited by any of the above-described example embodiments, but should be defined only in accordance with the following claims and their equivalents.

What is claimed is:

1. A monopulse secondary surveillance radar configured to integrate replies to active interrogations and passive squitter reception into a single surveillance system, said monopulse secondary surveillance radar comprising: a three-channel antenna arrangement comprising a sum channel, a difference channel, and an omega channel, said three-channel antenna arrangement configured to transmit interrogations, and to receive corresponding replies; a pair of redundant four-channel interrogators, each coupled to said three-channel antenna arrangement, and each comprising a transmitter and a receiver; a redundant secondary antenna arrangement, each comprising: a first omnidirectional (Automatic Dependent Surveillance-Broadcast) ADS-B antenna; a second omnidirectional ADS-B antenna; wherein said first omnidirectional ADS-B antenna is coupled to a first of said pair of redundant four-channel interrogators; and wherein said second omnidirectional ADS-B antenna is coupled to a second of said pair of redundant four-channel interrogators; and wherein said monopulse secondary surveillance radar is thereby configured to provide real-time passive detection of ADS-B-equipped aircraft in addition to active radar detection of aircraft to each of said pair of redundant four-channel interrogators, to lower active Mode S all-call interrogations needed by said three-channel antenna arrangement.

2. The monopulse secondary surveillance radar according to claim 1,
    wherein said first omnidirectional ADS-B antenna comprises a low noise amplifier; and
    wherein said second omnidirectional ADS-B antenna comprises a low noise amplifier.

3. The monopulse secondary surveillance radar according to claim 2, wherein each said redundant secondary antenna arrangements comprise a (Global Positioning System) GPS antenna integrated therein, wherein each said redundant four-channel interrogators are configured to utilize a GPS derived ADS-B antenna location and time-of-day to correctly process end report ADS-B information received from an aircraft to account for time tagging to correlate an aircraft position at an exact time.

4. The monopulse secondary surveillance radar according to claim 3, further comprising an on-line switch configured to alternately couple each of said pair of redundant four-channel interrogators with said three-channel antenna arrangement.

5. The monopulse secondary surveillance radar according to claim 1, wherein each of said first and second omnidirectional ADS-B antennas is configured to receive and process at least one of the following types of unsolicited squittered transmissions: ADS-B Mode S 1090 MHz extended squitters, (Identification Friend or Foe) IFF Mode 5 Level 2 squittered reports, and (Universal Access Transceiver) UAT ADS-B messages.

* * * * *